US011294745B1

(12) United States Patent
Leggette et al.

(10) Patent No.: US 11,294,745 B1
(45) Date of Patent: Apr. 5, 2022

(54) STORAGE UNIT (SU) IMPLEMENTED TO SERVICE ALTERNATE READ SLICE REQUESTS

(71) Applicant: Pure Storage, Inc., Mountain View, CA (US)

(72) Inventors: Wesley B. Leggette, Chicago, IL (US); Andrew D. Baptist, Mt. Pleasant, WI (US); Greg R. Dhuse, Chicago, IL (US); Jason K. Resch, Chicago, IL (US); Gary W. Grube, Barrington Hills, IL (US); S. Christopher Gladwin, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 188 days.

(21) Appl. No.: 16/837,164

(22) Filed: Apr. 1, 2020

Related U.S. Application Data

(63) Continuation of application No. 15/824,783, filed on Nov. 28, 2017, now Pat. No. 10,621,021, which is a
(Continued)

(51) Int. Cl.
*G06F 7/02* (2006.01)
*G06F 16/00* (2019.01)
(Continued)

(52) U.S. Cl.
CPC .......... *G06F 11/0727* (2013.01); *G06F 3/064* (2013.01); *G06F 3/067* (2013.01);
(Continued)

(58) Field of Classification Search
CPC .... G06F 11/0727; G06F 16/23; G06F 16/278; G06F 3/064; G06F 3/067; G06F 11/1076;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Bruce M Moser
(74) *Attorney, Agent, or Firm* — Garlick & Markison; Shayne X. Short

(57) ABSTRACT

A computing device includes an interface configured to interface and communicate with a dispersed storage network (DSN), a memory that stores operational instructions, and processing circuitry operably coupled to the interface and to the memory. The computing device obtains a data identifier associated with a data object and determines DSN address (es) associated with storage of one or more encoded data slice(s) (EDS(s)). The computing device selects slice names based on the DSN address(es) and issues at least a read threshold number of read slice requests using slice names to at least some storage units (SUs). When an insufficient number of EDSs is received, the computing device issues an alternate read slice request to an alternate SU. When a sufficient number of EDSs is received from the alternate SU and the computing device has received at least the read threshold number of EDSs, the computing device reconstructs the data segment.

20 Claims, 7 Drawing Sheets

Related U.S. Application Data continuation-in-part of application No. 14/102,987, filed on Dec. 11, 2013, now Pat. No. 10,055,441.

(60) Provisional application No. 61/760,962, filed on Feb. 5, 2013.

(51) Int. Cl.
| | |
|---|---|
| *G06F 11/07* | (2006.01) |
| *H04L 67/1097* | (2022.01) |
| *G06F 3/06* | (2006.01) |
| *G06F 16/27* | (2019.01) |
| *G06Q 50/00* | (2012.01) |
| *G06F 11/10* | (2006.01) |
| *G06F 16/23* | (2019.01) |
| *G06Q 10/10* | (2012.01) |

(52) U.S. Cl.
CPC .......... *G06F 11/1076* (2013.01); *G06F 16/23* (2019.01); *G06F 16/278* (2019.01); *G06Q 10/101* (2013.01); *G06Q 50/01* (2013.01); *H04L 67/1097* (2013.01)

(58) Field of Classification Search
CPC ... G06Q 10/101; G06Q 50/01; H04L 67/1097
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,335,918 | B2 | 12/2012 | Shon |
| 9,026,869 | B1 * | 5/2015 | Li .......... G11C 29/38 714/718 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0015471 | A1 | 1/2005 | Zhang et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0083039 | A1 * | 4/2010 | Chew ..... G06F 21/80 714/6.12 |
| 2010/0095012 | A1 | 4/2010 | Zuckerman et al. |
| 2011/0307447 | A1 | 12/2011 | Sabaa et al. |
| 2013/0031256 | A1 | 1/2013 | Hampel |
| 2013/0031414 | A1 | 1/2013 | Dhuse et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

SMITH; Lightweight Directory Access Protocol (LDAP): Uniform Resource Locator; IETF Network Working Group RFC 4516; Jun. 2006; pp. 1-15.

(56) References Cited

OTHER PUBLICATIONS

Wildi; Java iSCSi Initiator; Master Thesis; Department of Computer and Information Science, University of Konstanz Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Croup; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

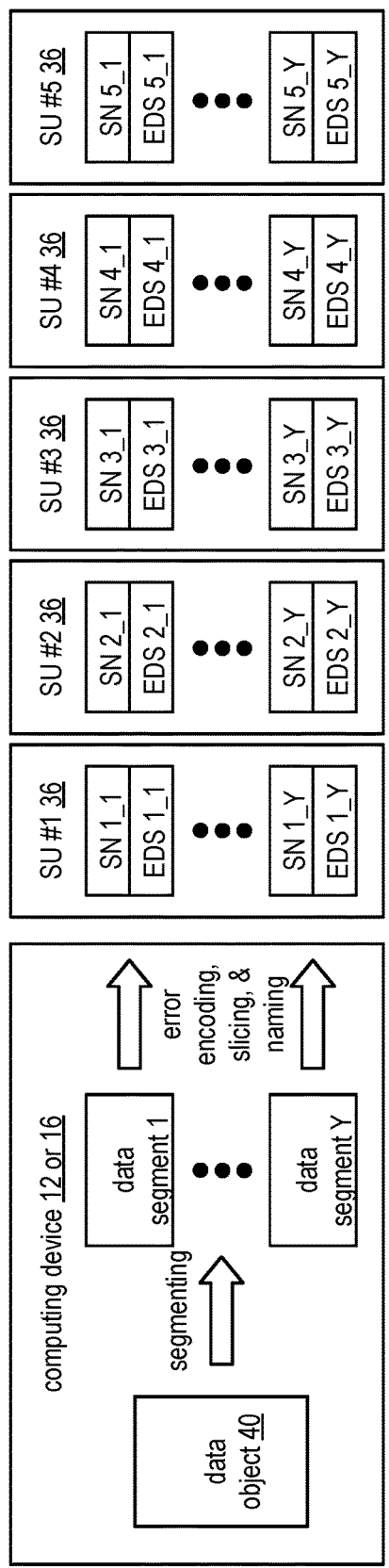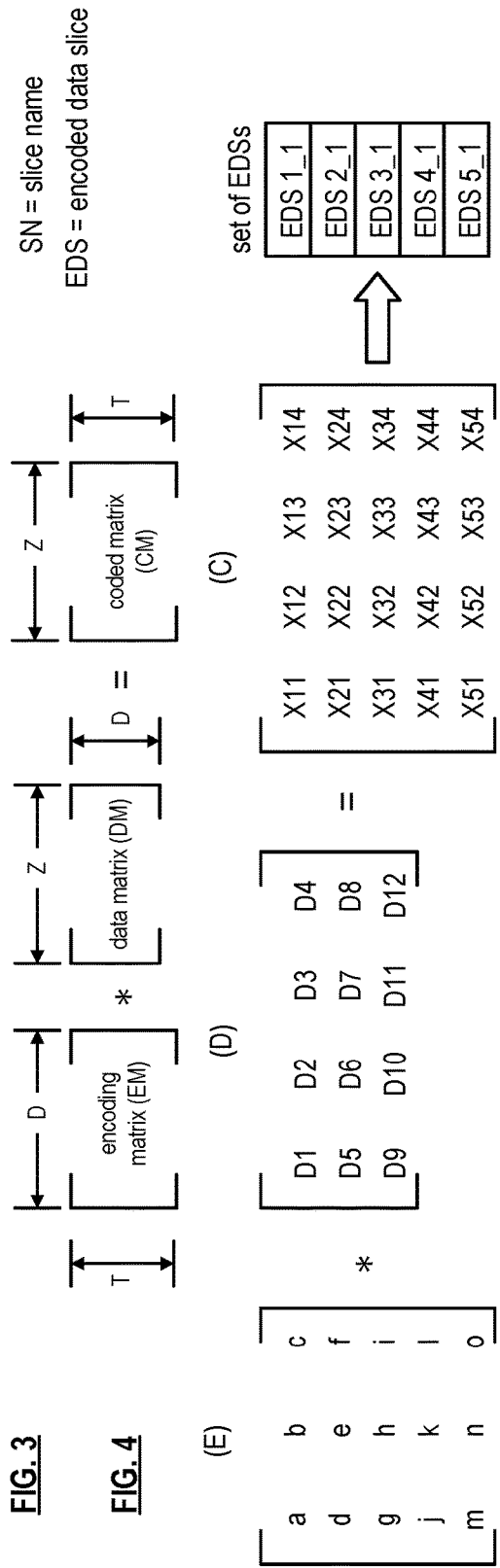
FIG. 3
FIG. 4
FIG. 5
FIG. 6

STORAGE UNIT (SU) IMPLEMENTED TO SERVICE ALTERNATE READ SLICE REQUESTS

CROSS REFERENCE TO RELATED PATENTS

The present U.S. Utility Patent Application claims priority pursuant to 35 U.S.C. § 120, as a continuation of U.S. Utility patent application Ser. No. 15/824,783, entitled "USING DISPERSED DATA STRUCTURES TO POINT TO SLICE OR DATE SOURCE REPLICAS," filed Nov. 28, 2017, scheduled to issue as U.S. Pat. No. 10,621,021 on Apr. 14, 2020, which is a continuation-in-part (CIP) of U.S. Utility patent application Ser. No. 14/102,987, entitled "UPDATING SHARED GROUP INFORMATION IN A DISPERSED STORAGE NETWORK," filed Dec. 11, 2013, now issued as U.S. Pat. No. 10,055,441 on Aug. 21, 2018, which claims priority pursuant to 35 U.S.C. § 119(e) to U.S. Provisional Application No. 61/760,962, entitled "MANAGING A DISPERSED STORAGE NETWORK POWER CONSUMPTION," filed Feb. 5, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems may experience excessive communication traffic that makes retrieval of data from one or more components in such prior art data storage systems very difficult in not impossible. In some instance, such prior art data storage systems may be so adversely affected that data access simply fail to timeout without being serviced. There continues to exist room for improvement in the manner by which data storage systems operate.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
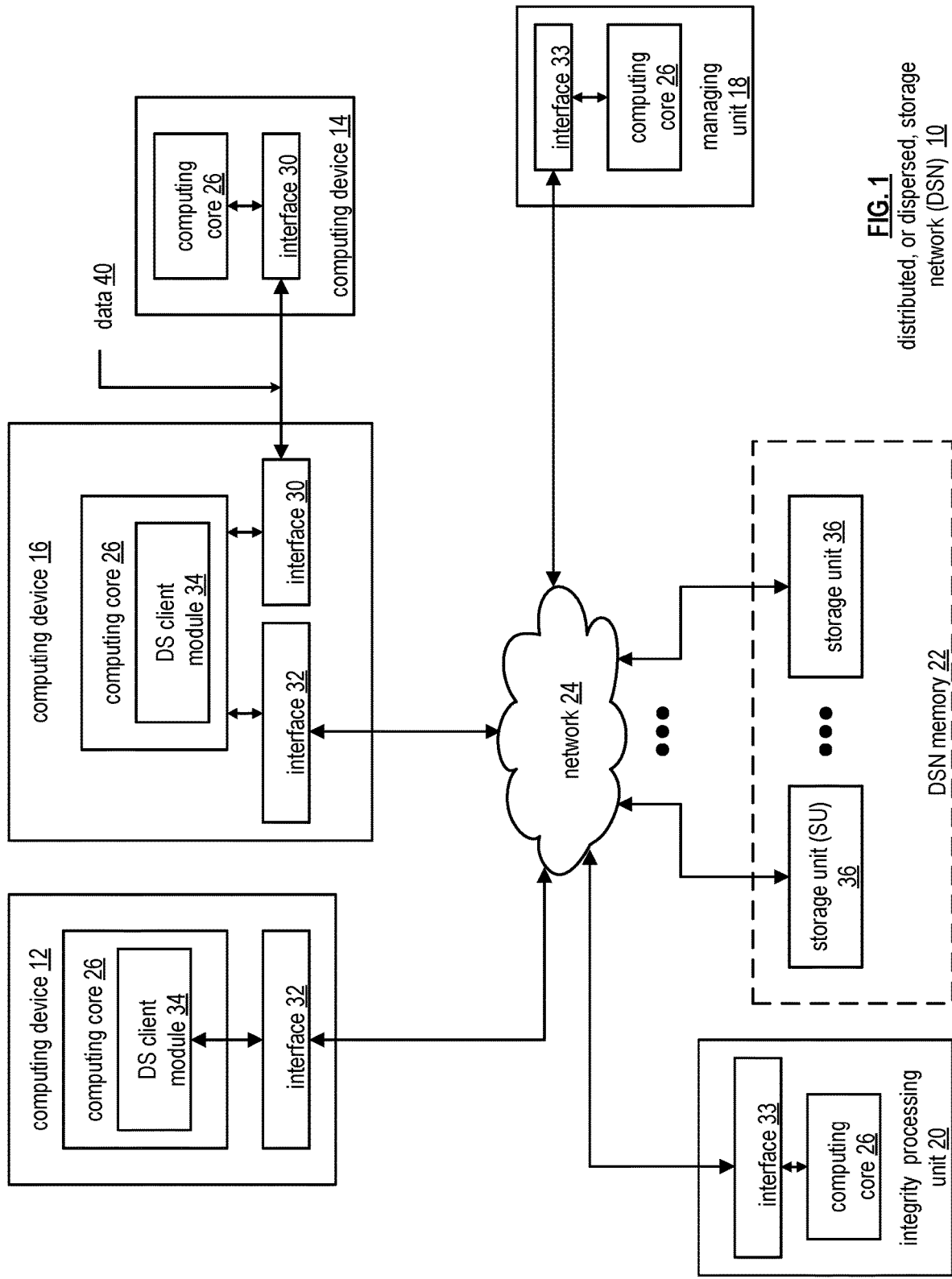
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
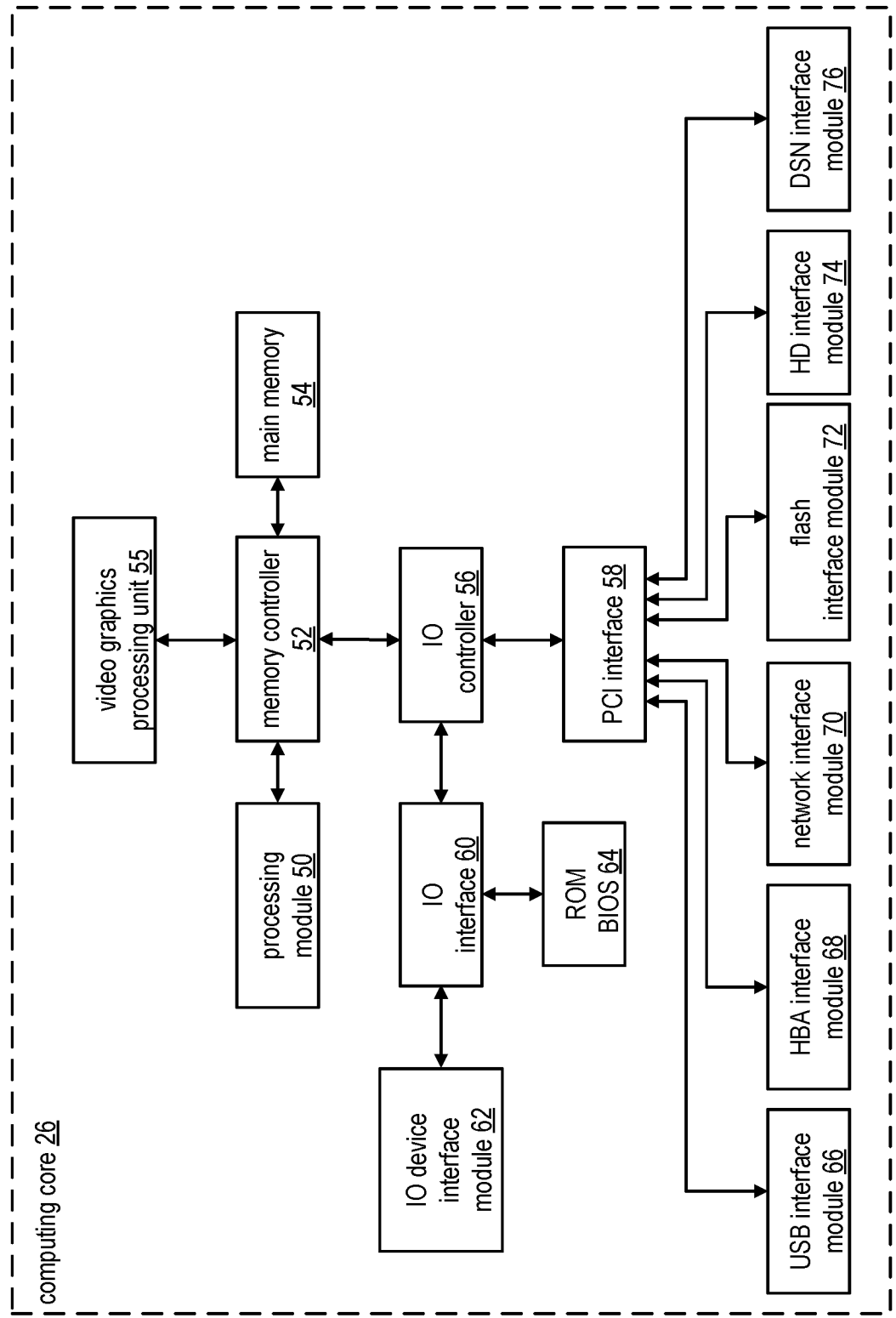
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
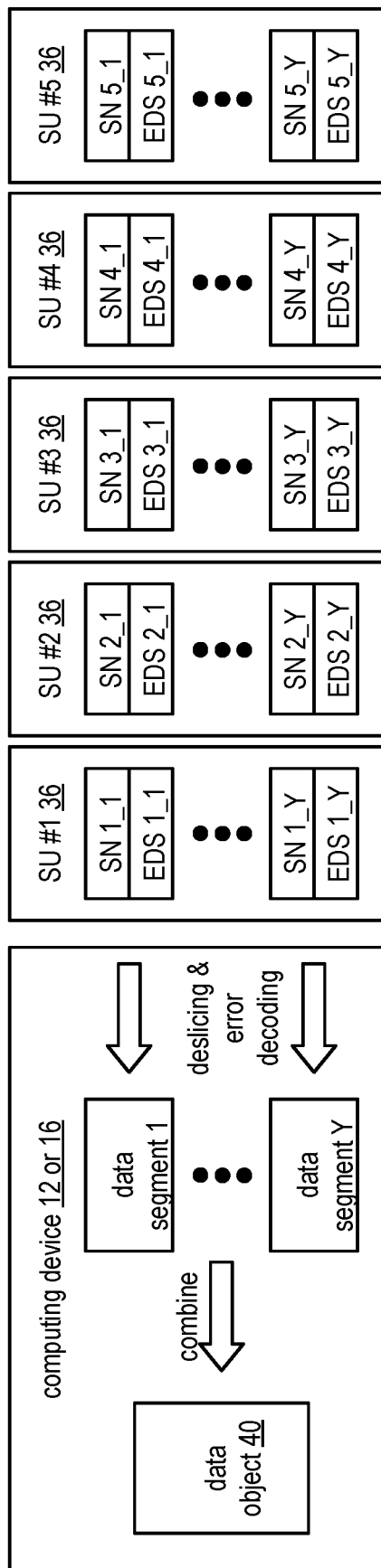
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
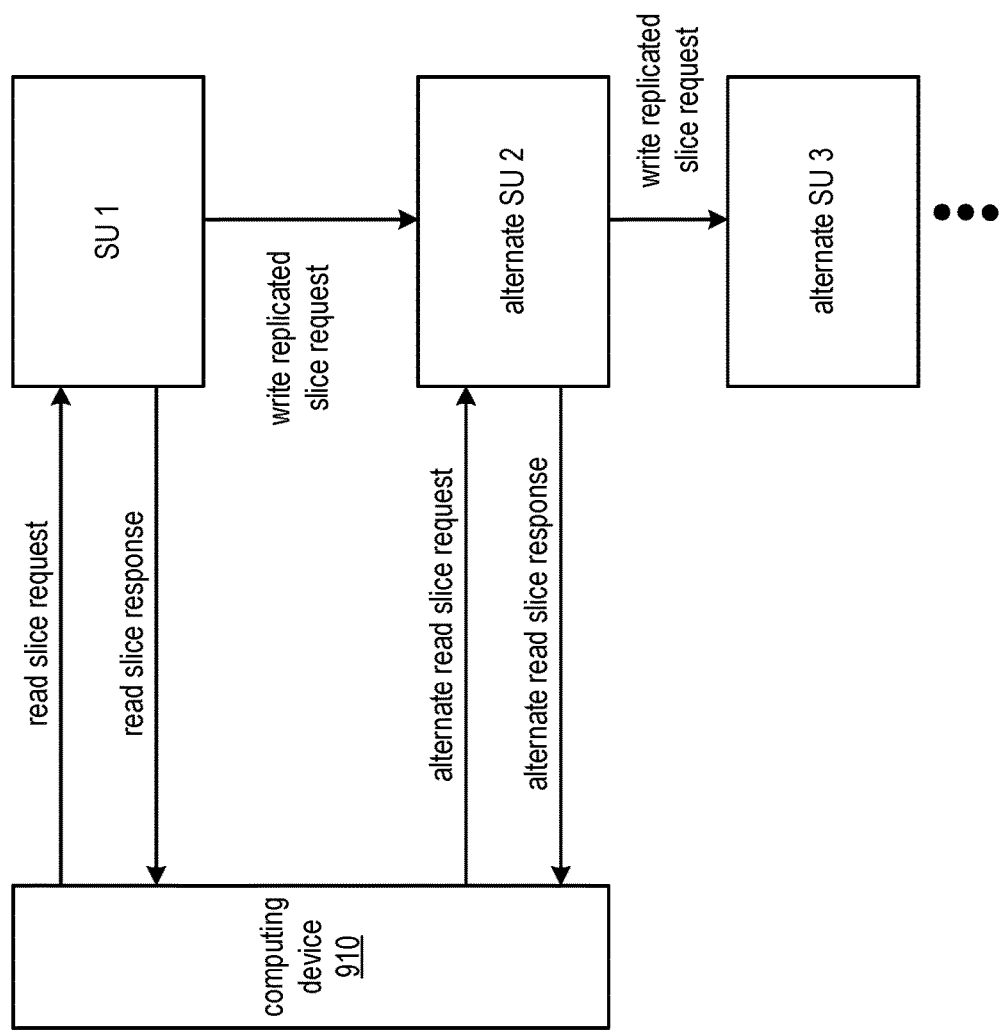
FIG. 9 is a schematic block diagram of another embodiment of a distributed computing system in accordance with the present invention.

FIG. 9 is a schematic block diagram of another embodiment of a distributed computing system in accordance with the present invention. This diagram includes a schematic block diagram of another embodiment of a distributed computing system that includes a computing device 910, a storage unit (SU) (e.g., SU 1), an alternate SU (e.g., an alternate SU 2), and another alternate SU (e.g., an alternate SU 3). Alternatively, the system may include any number of other alternate SUs. Each SU may be implemented by one or more of a storage unit (SU), a storage server, a distributed computing server, a memory module, a memory device, a user device, a computing device, and a DS processing unit. The computing device 910 may be implemented utilizing one or more of a computing device, a SU, a SU, a storage server, a distributed computing server, a user device, a DS processing unit, the SU, the alternate SU, and the other alternate SU.

The system functions to provide access to slices stored in the SU and replicated slices of the slices where the replicated slices are stored in one or more of the alternate SU and the other alternate SU. The computing device 910 obtains a data identifier for data to be retrieved (e.g., receives the data identifier, performs a lookup). The computing device 910 accesses an index using the data identifier to identify one or more dispersed or distributed storage network (DSN) addresses associated with storage of one or more slices of the data. Such a DSN address may include one or more of a slice name, an alternate slice name, a source name, and an alternate source name. For example, a slice name and an alternate slice name are aliased to a common slice listed in the index.

The computing device 910 selects a set of slice names based on the one or more DSN addresses. The computing device 910 issues at least a read threshold number of read slice requests using the selected set of slice names to a set of SUs that includes at least one of the SU, the alternate SU, and/or the other alternate SU. The read slice requests include a slice name of a desired slice for retrieval. The at least one of the SU, the alternate SU, and/or the other alternate SU issues a read slice response to the computing device 910 where the read slice responses includes one or more of the slice name and the desired slice. When receiving a threshold number of slices (e.g., at least a decode threshold number of slices for each data segment of a plurality of data segments of the data), the computing device 910 decodes the receives slices to reproduce the data. When not receiving the threshold number of slices, the computing device 910 issues additional read slice requests using other slice names. For example, when the computing device 910 is missing a slice from the SU, the computing device 910 issues an alternate read slice request to the alternate SU to retrieve the slice. The alternate read slice request includes an alternate slice name for the slice. The alternate SU issues and alternate read slice response that includes the slice when the alternate SU stores a replicated slice of the slice.

The SU determines whether to provide one or more replicated slices for a slice stored in the SU (e.g., based on SU performance). For example, the SU determines to provide a replicated slice for the slice when the SU is overloaded. When providing the one or more replicated slices, for each slice, the SU generates an alternate slice name and issues a write replicated slice request to an alternate SU where the request includes the alternate slice name and the replicated slice. The replicated slice is substantially the same as the slice. The write replicated slice request further includes one or more of the replicated slice, the alternate slice name, a storage time frame, and a performance threshold. For each slice, the SU updates the index to associate the alternate slice name with the data ID (e.g., multiple aliased slice names for the data and/or for each data segment of the data).

The alternate SU receives an alternate read slice request for a replicated slice and issues an alternate read slice response to a requesting entity that includes a replicated slice when the replicated slice is available to the alternate SU. Alternatively, or in addition to, in a similar fashion, the alternate SU may determine whether to further replicate a replicated slice to the other alternate SU.

In an example of operation and implementation, the computing device 910 includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. in certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, the computing device 910 is configured to obtain a data identifier associated with a data object. In some examples, the data object is segmented into a plurality of data segments, and a data segment of the plurality of data segments is dispersed error encoded in accordance with dispersed error encoding parameters to produce a plurality of encoded data slices (EDSs) that is distributedly stored among a plurality of storage units (SUs) within the DSN. Also, note that a read threshold number of EDSs provides for reconstruction of the data segment. The computing device 910 is also configured to determine one or more DSN addresses associated with storage of one or more of the plurality of EDSs and to select a plurality of slice names based on the one of more DSN addresses.

The computing device 910 is also configured to issue at least a read threshold number of read slice requests using the plurality of slice names to at least some of the plurality of SUs. When fewer than the read threshold number of EDSs is received from the at least some of the plurality of SUs in response to issuance of the at least the read threshold number of read slice requests, the computing device 910 is configured to issue an alternate read slice request to an alternate SU to retrieve an alternate EDS among the read threshold number of EDSs. Also, when the alternate EDS among the read threshold number of EDSs is received from the alternate SU and the computing device has received at least the read threshold number of EDSs, the computing device 910 is configured to reconstruct the data segment.

In some examples, a DSN address of the one or more DSN addresses includes a slice name of the plurality of slice names, an alternate slice name, a source name, and/or an alternate source name. Also, the slice name and the source name are aliased to a common slice listed in an index that associates the data identifier to the one or more DSN addresses.

In certain other examples, when the at least the read threshold number of EDSs is received from the at least some of the plurality of SUs in response to the issuance of the at least the read threshold number of read slice requests, the computing device 910 is configured to reconstruct the data segment.

Note that a SU of the at least some of the plurality of SUs (e.g., SU 1) is configured to determine to provide one or more alternate EDSs including the alternate EDS to the alternate SU (e.g., alternate SU 2) to be stored temporarily in the alternate SU when the SU of the at least some of the plurality of SUs is overloaded based on servicing requests for at least one EDS stored within the SU of the at least some of the plurality of SUs. In some examples, note that the alternate EDS to be stored temporarily in the alternate SU is substantially same as an EDS stored within the SU of the at least some of the plurality of SUs.

Also, note that the SU of the at least some of the plurality of SUs vis further configured to issue a write replicated slice request to the alternate SU (e.g., alternate SU 2). In some examples, note that the write replicated slice request includes an alternate slice name, a replicated EDS, a storage time frame, and/or a performance threshold.

In some examples, with respect to a data object, the data object is segmented into a plurality of data segments, and a data segment of the plurality of data segments is dispersed error encoded in accordance with dispersed error encoding parameters to produce a set of encoded data slices (EDSs) that are distributedly stored in a plurality of storage units (SUs) within the DSN. In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other computing device, SU, DS unit, at least one SU of a plurality of SUs within the DSN (e.g., such as a plurality of SUs that are implemented to store distributedly the set of EDSs), etc. In addition, note that such a computing device as described herein may be implemented as any of a number of different devices including a managing unit that is remotely located from another computing device, SU, DS unit, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

Figure 10:
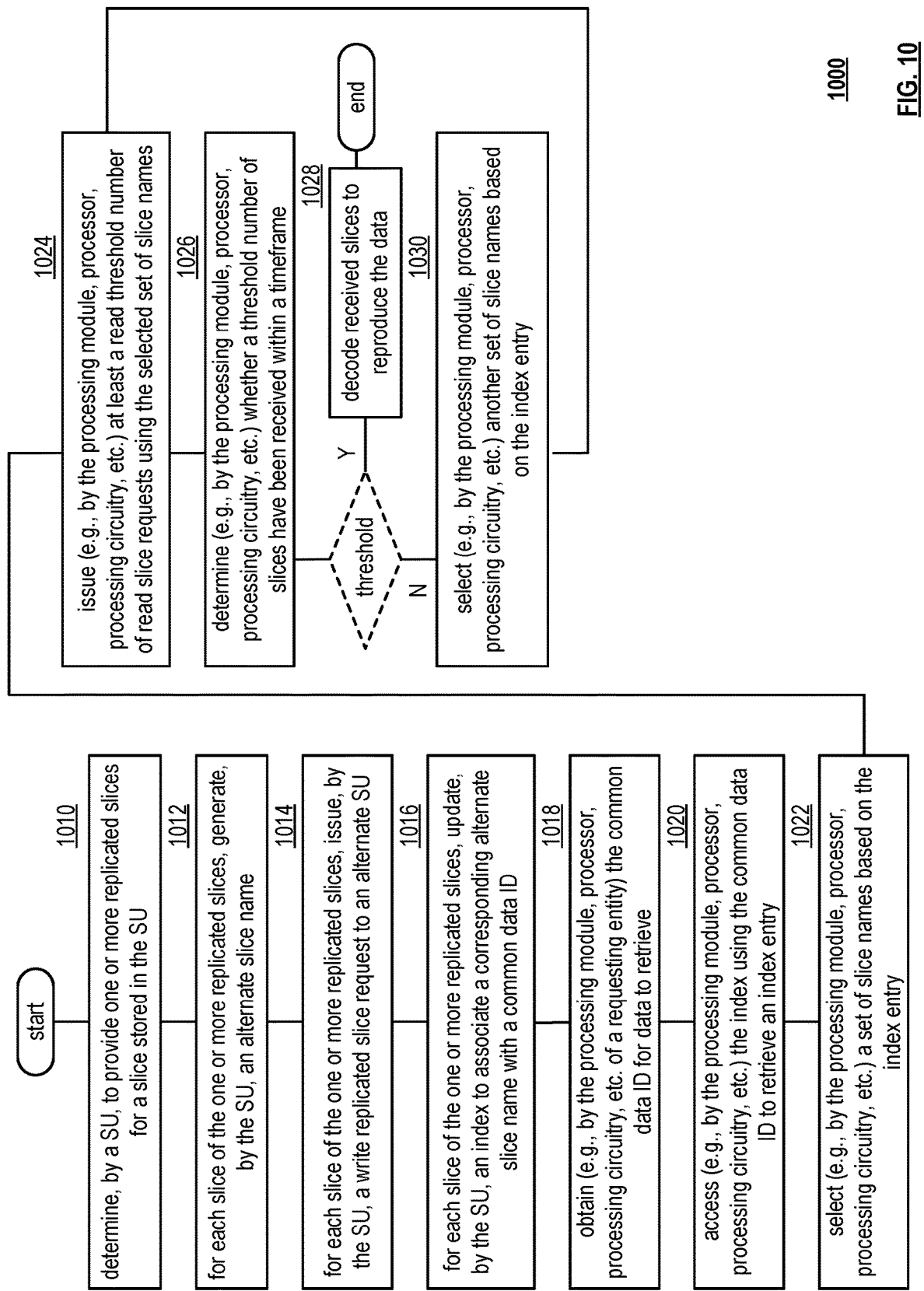
FIG. 10 is a flowchart illustrating another example of providing data access in accordance with the present invention.

FIG. 10 is a flowchart illustrating another example of providing data access in accordance with the present invention. This diagram includes a flowchart illustrating another example of providing data access. The method 1000 begins at a step 1010 where a storage unit (SU) determines to provide one or more replicated slices for a slice stored in the SU (e.g., based on one or more of a SU performance level and a performance threshold level). For each slice of the one or more replicated slices, the method 1000 continues at the step 1012 where the SU generates an alternate slice name. The generating may be based on one or more of a vault ID, a slice name of the slice, a data identifier associated with the slice, and an offset scheme. For each slice of the one or more replicated slices, the method 1000 continues at the step 1014 where the SU issues a write replicated slice request to an alternate SU. For example, the SU generates the request to include a corresponding alternate slice name and the replicated slice and outputs the request to the alternate SU for storage therein.

For each of the one or more replicated slices, the method 1000 continues at the step 1016 where the SU updates an index to associate a corresponding alternate slice name with a common data identifier. For example, the SU updates an index entry of the index associated with the data identifier to include the corresponding alternate slice name and/or an alternate source name. The method 1000 continues at the step 1018 where a processing module of a requesting entity (e.g., a computing device, a SU, a SU, and/or other device) obtains the common data identifier for data to retrieve (e.g., receive, look up). The method 1000 continues at the step 1020 where the processing module of the requesting entity accesses the index utilizing the common data identifier to retrieve the index entry. The accessing includes performing a lookup starting with a root node of the index based on the data identifier or an attribute of the data and searching the index to identify the index entry for retrieval. The method 1000 continues at the step 1022 where the processing module of the requesting entity selects a set of slice names based on the index entry. The selecting may be based on one or more of a priority indicator, a performance indicator, and a random selection.

The method 1000 continues at the step 1024 where the processing module of the requesting entity issues at least a read threshold number of read slice requests using the selected set of slice names. The issuing includes generating the requests using the selected set of slice names and outputting the requests to the alternate SU and/or another alternate SU. The method 1000 continues at the step 1026 where the processing module of the requesting entity determines whether a threshold number of slices have been received within a timeframe. The method 1000 branches to the step 1030 where the processing module selects another set of slice names when the threshold number of slices have not been received within the time frame. The method 1000 continues to the next step when the threshold number of slices have been received within the time frame. The method 1000 continues at the next step 1028 where the processing module of the requesting entity decodes receives slices to reproduce the data. The method 1000 continues at the step 1030 where the processing module of the requesting entity further selects another set of slice names based on the index entry. Further selecting further includes excluding a previous slice name associated with failed responses. The method 1000 loops back to the step 1024 where the processing module of the requesting entity issues the at least the read threshold number of read slice requests.

Figure 11:
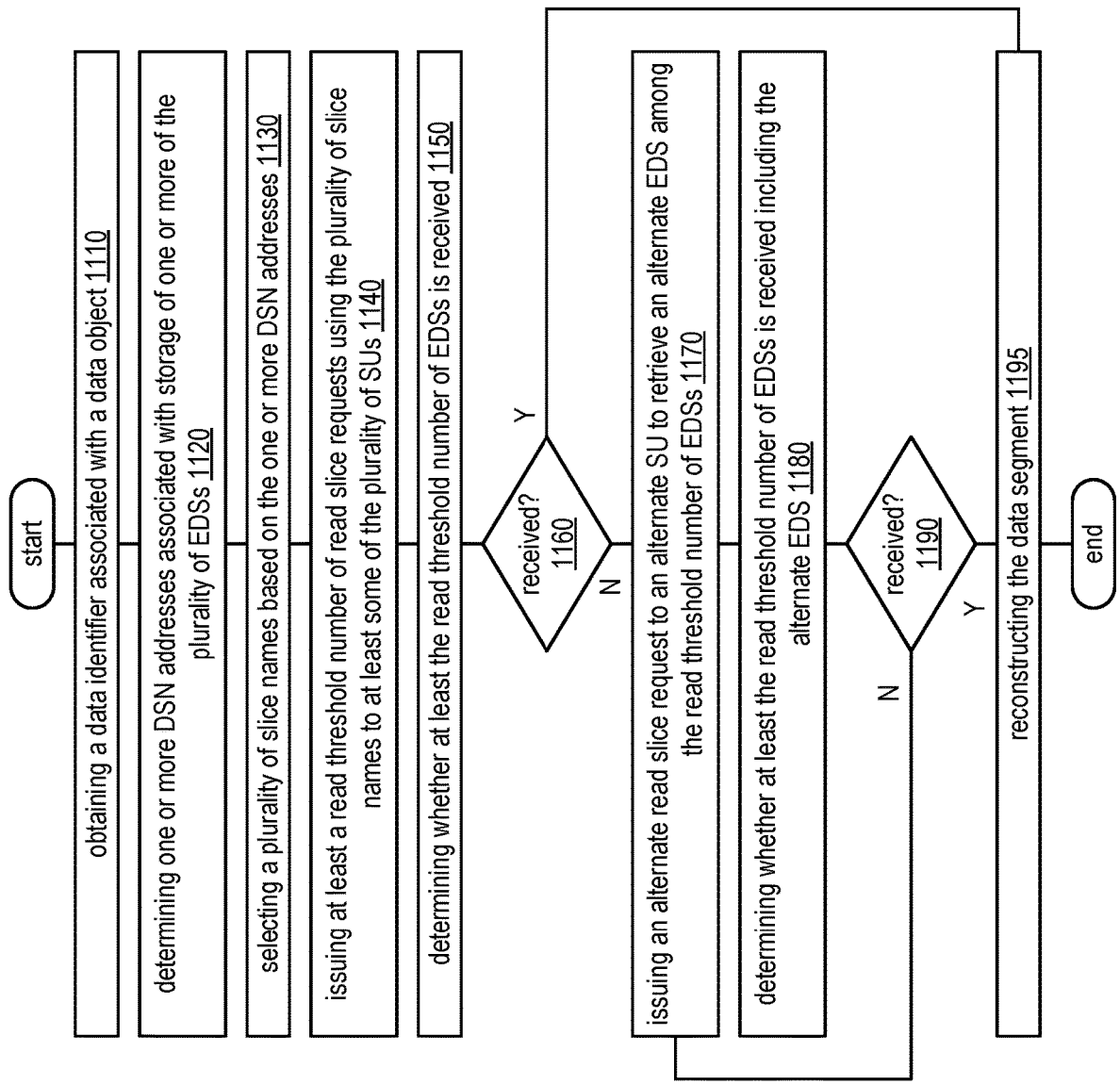
FIG. 11 is a diagram illustrating an embodiment of a method for execution by one or more computing devices in accordance with the present invention.

FIG. 11 is a diagram illustrating an embodiment of a method 1100 for execution by one or more computing devices in accordance with the present invention. The method 1100 operates in step 1110 by obtaining a data identifier associated with a data object. In some examples, the data object is segmented into a plurality of data segments, and a data segment of the plurality of data segments is dispersed error encoded in accordance with dispersed error encoding parameters to produce a plurality of encoded data slices (EDSs) that is distributedly stored among a plurality of storage units (SUs) within a dispersed or distributed storage network (DSN). Note that a read threshold number of EDSs provides for reconstruction of the data segment.

The method 1100 then continues in step 1120 by determining one or more DSN addresses associated with storage of one or more of the plurality of EDSs. The method 1100 operates in step 1130 by selecting a plurality of slice names based on the one or more DSN addresses. The method 1100 then continues in step 1140 by issuing (e.g., via an interface of the computing device that is configured to interface and communicate with a dispersed or distributed storage network (DSN)) at least a read threshold number of read slice requests using the plurality of slice names to at least some of the plurality of SUs.

The method 1100 then operates in step 1150 by determining whether at least the read threshold number of EDSs is received.

When the read threshold number of EDSs is received via the interface from the at least some of the plurality of SUs in response to issuance of the at least the read threshold number of read slice requests as determined in step 1160, the method 1100 then operates in step 1195 by reconstructing the data segment.

Alternatively, when fewer than the read threshold number of EDSs is received via the interface from the at least some of the plurality of SUs in response to issuance of the at least the read threshold number of read slice requests as determined in step 1160, the method 1100 then operates in step 1170 by issuing an alternate read slice request to an alternate SU to retrieve an alternate EDS among the read threshold number of EDSs. The method 1100 then operates in step 1150 by determining whether at least the read threshold number of EDSs is received including the alternate EDS.

When the read threshold number of EDSs received including the alternate EDS is received via the interface as determined in step 1190, the method 1100 then operates in step 1195 by reconstructing the data segment. Alternatively, when the read threshold number of EDSs received including the alternate EDS is received via the interface as determined in step 1190, the method 1100 then operates in step 1195 by reconstructing the data segment.

Alternatively, when the alternate EDS among the read threshold number of EDSs is not received via the interface from the alternate SU and the computing device has received at least the read threshold number of EDSs, the method 1100 branches back to step 1170.

This disclosure presents, among other things, various novel solutions that provide for retrieval of data from a dispersed data storage system. For example, when requests for an object, segments of an object, and/or slices become too frequent for the SUs holding those slices to handle, then a temporary replica of those slices, segments, and/or object may be stored to a newly chosen location in the namespace in that vault. Having an alternate namespace location requires having a different name, thus the replicated slices (or segments) obtain aliases. The aliases for a given slice name or source name can then be stored in a dispersed data structure, such as a dispersed index or map. When a reader (e.g., a computing device that make a read request to a SU) determines a request for a slice or segment, and/or object fails due to being overloaded, it performs a look up in the dispersed index for the slice name, or source name(s) for the segment or object. The value associated with this lookup is a list of all the alternate slice names/source names, and the reader may choose any of them to satisfy the request. If the request fails, it then uses another alias, and continues until every alternate name has attempted and failed, or until one has succeeded.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A storage unit (SU) comprising:
    an interface configured to interface and communicate with a dispersed or distributed storage network (DSN);
    memory that stores operational instructions; and
    processing circuitry operably coupled to the interface and to the memory, wherein the processing circuitry is configured to execute the operational instructions to:
        receive a write replicated slice request that includes a replicated encoded data slice (EDS) via the interface and from another SU within the DSN that has received a read slice request from a computing device within the DSN, wherein the read slice request is associated with a data object that is segmented into a plurality of data segments, wherein a data segment of the plurality of data segments is dispersed error encoded in accordance with dispersed error encoding parameters to produce a plurality of encoded data slices (EDSs) that is distributedly stored among a plurality of storage units (SUs) within the DSN, wherein a read threshold number of EDSs provides for reconstruction of the data segment, wherein the replicated EDS is based on one of the plurality of EDSs;
        receive an alternate read slice request via the interface and from the computing device within the DSN; and
        transmit, in response to the alternate read slice request, an alternate read slice response that includes the replicated EDS via the interface and to the computing device within the DSN to be used by the computing device in accordance with the reconstruction of the data segment.

2. The SU of claim 1, wherein the processing circuitry is further configured to execute the operational instructions to:
    receive the alternate read slice request via the interface and from the computing device within the DSN based on the computing device failing to receive at least one EDS from the another SU in accordance with a read slice response from the another SU to the computing device.

3. The SU of claim 1, wherein the processing circuitry is further configured to execute the operational instructions to:
    receive the alternate read slice request via the interface and from the computing device within the DSN based on at least one of the another SU performing below a performance threshold or the another SU being overloaded.

4. The SU of claim 1, wherein the processing circuitry is further configured to execute the operational instructions to:
    transmit the write replicated slice request that includes the replicated EDS or another replication of the replicated EDS via the interface and to at least one other SU within the DSN.

5. The SU of claim 1, wherein the write replicated slice request also includes at least one of an alternate slice name, a storage time frame, or a performance threshold.

6. The SU of claim 1, wherein the computing device is implemented by one or more of at least one other SU, a storage server, a distributed computing server, a user device, a distributed storage (DS) processing unit, or the another SU.

7. The SU of claim 1, wherein the SU is implemented by one or more of a storage server, a distributed computing server, a memory module, a memory device, a user device, another computing device, or a distributed storage (DS) processing unit.

8. The SU of claim 1, wherein the SU is located at a first premises that is remotely located from a second premises of at least one other SU of the plurality of SUs within the DSN.

9. The SU of claim 1, wherein the computing device includes a wireless smart phone, a laptop, a tablet, a personal computers (PC), a work station, or a video game device.

10. The SU of claim 1, wherein the DSN includes at least one of a wireless communication system, a wire lined communication system, a non-public intranet system, a public internet system, a local area network (LAN), or a wide area network (WAN).

11. A method for execution by a storage unit (SU), the method comprising:
    receiving a write replicated slice request that includes a replicated encoded data slice (EDS) via an interface of the SU that is configured to interface and communicate with a dispersed or distributed storage network (DSN) and from another SU within the DSN that has received a read slice request from a computing device within the DSN, wherein the read slice request is associated with a data object that is segmented into a plurality of data segments, wherein a data segment of the plurality of data segments is dispersed error encoded in accordance with dispersed error encoding parameters to produce a plurality of encoded data slices (EDSs) that is distributedly stored among a plurality of storage units (SUs) within the DSN, wherein a read threshold number of EDSs provides for reconstruction of the data segment, wherein the replicated EDS is based on one of the plurality of EDSs;
    receiving an alternate read slice request via the interface and from the computing device within the DSN; and
    transmitting, in response to the alternate read slice request, an alternate read slice response that includes the replicated EDS via the interface and to the computing device within the DSN to be used by the computing device in accordance with the reconstruction of the data segment.

12. The method of claim 11 further comprising:
    receiving the alternate read slice request via the interface and from the computing device within the DSN based on the computing device failing to receive at least one EDS from the another SU in accordance with a read slice response from the another SU to the computing device.

13. The method of claim 11 further comprising:
    receiving the alternate read slice request via the interface and from the computing device within the DSN based on at least one of the another SU performing below a performance threshold or the another SU being overloaded.

14. The method of claim 11 further comprising:
transmitting the write replicated slice request that includes the replicated EDS or another replication of the replicated EDS via the interface and to at least one other SU within the DSN.

15. The method of claim 11, wherein the write replicated slice request also includes at least one of an alternate slice name, a storage time frame, or a performance threshold.

16. The method of claim 11, wherein the computing device is implemented by one or more of at least one other SU, a storage server, a distributed computing server, a user device, a distributed storage (DS) processing unit, or the another SU.

17. The method of claim 11, wherein the SU is implemented by one or more of a storage server, a distributed computing server, a memory module, a memory device, a user device, another computing device, or a distributed storage (DS) processing unit.

18. The method of claim 11, wherein the SU is located at a first premises that is remotely located from a second premises of at least one other SU of the plurality of SUs within the DSN.

19. The method of claim 11, wherein the computing device includes a wireless smart phone, a laptop, a tablet, a personal computers (PC), a work station, or a video game device.

20. The method of claim 11, wherein the DSN includes at least one of a wireless communication system, a wire lined communication system, a non-public intranet system, a public internet system, a local area network (LAN), or a wide area network (WAN).

* * * * *